United States Patent Office 3,450,734
Patented June 17, 1969

3,450,734
METHOD OF PREPARING TRIALKYL
LEAD ACETATE
Evan A. Mayerle and Richard L. Craig, Lake Jackson, Tex., assignors to Nalco Chemical Company, Chicago, Ill., a corporation of Delaware
No Drawing. Filed June 3, 1966, Ser. No. 554,995
Int. Cl. C07f 7/24
U.S. Cl. 260—436                          3 Claims

ABSTRACT OF THE DISCLOSURE

Trialkyl lead acetates are prepared by reacting a tetraalkyl lead with cupric acetate.

The present invention is concerned with a method of preparing trialkyl lead salts. More specifically, the invention relates to an improved method of preparing trialkyl lead acetate.

Trialkyl lead salts such as those in the acetate form have been found to be useful for a variety of purposes, finding activity as fungicides, bactericides, etc. However, the synthesis of such salts is usually carried out in a tedious manner via a series of complicated steps. For example, prior art preparation of trialkyl lead acetate, a useful biocides, are somewhat laborious. Probably the best method known involves reaction of a tetraalkyl lead such a tetrabutyl lead with anhydrous or aqueous hydrochloric acid to produce the tributyl chloride salt. This material is further reacted with moist silver oxide to produce the intermediate tributyl hydroxide form. Lastly, the hydroxide is converted to the acetate form by reaction with acetic acid. As is readily apparent, the preparation is somewhat involved and particularly disadvantageous from a commercial standpoint since it involves use of a rather costly reagent, silver oxide. It would be of extreme benefit to the art if a simple procedure of forming trialkyl lead acetates were known.

In view of the above, it therefore becomes an object of the invention to provide a simple and inexpensive one-step method for producing trialkyl lead acetate salts.

Other objects will appear hereinafter.

In accordance with the invention, we have discovered that trialkyl acetates may be simply and conveniently prepared by reaction of tetraalkyl leads with cupric acetate. The simple one-step preparative technique is a substantial advance in the art. Yields were surprisingly high and recovery of the desired product from the reaction mass was carried out with a minimum of work-up.

More specifically, the instant invention is carried out by reacting approximately equal molar amounts of a tetraalkyl lead with cupric acetate. The tetraalkyl lead reactant may be chosen from a wide variety of materials. Preferably, the organo radicals attached to the lead atom may vary in carbon content from about 1 to about 10. Moreover, the tetraalkyl lead reactant may be symmetrical, that is, have identical alkyl radicals, or the reactant may contain mixed alkyl radicals falling within the above-defined carbon content. Most preferably, the lead reactant is chosen from among tetramethyl lead, tetraethyl lead and tetrabutyl lead. The invention is particularly adapted to synthesis of tributyl lead acetate from tetrabutyl lead.

Yields ranging from about 60% to about 80% have been realized in the simple one-step process of the invention. Such achievement is a distinct advantage over prior art methods involving a number of steps with possible yield loss during each step.

The reaction itself is preferably carried out in presence of a water-soluble polar organic solvent acting as a solvating media for the lead reactant. Such materials as isopropyl alcohol, methanol, ethanol, hydroxy ethers, such as "Cellosolve" alcohols as 2-methoxy ethanol, 2-ethoxy ethanol, 2-propoxy ethanol and "Carbitols" such as the diethyl ether of tetraethylene glycols, tetrahydrofuran, and like materials are useful in practice of the invention. In a preferred embodiment, the total concentration of reactants in solvent ranges from about 10% to about 20% by weight.

Generally, the reaction is carried out with mild heating, preferably within the range of 40° C. to about 90° C. and most preferably 50–80° C. Again, depending upon the nature of the tetraalkyl lead reactant, the reaction duration may vary over a considerable range of time. Generally, the reaction is complete in a time ranging from about 1 to about 6 hours and usually 1–4 hours time. A simple technique to follow the completeness of reaction of lower alkyl leads involves measuring gas production. In these instances, one mole of gas such as methane, ethane, butane, etc., is produced for each mole of tetraalkyl lead converted to the trialkyl lead acetate form.

A by-product in the reaction is cuprous oxide which falls out of solution during the synthesis and is simply removed from the reaction mass by filtration. The desired product salt will generally remain in solution and work-up is usually effected by evaporation of the solvent from the lead salt until a slurry is produced. Then precipitation of the desired product salt from the slurry is carried out by addition of the slurry to an aqueous solution. Purification is generally effected by recrystallization from a number of known solvents such as petroleum ether.

To make the reaction more commercially attractive, we have also discovered that the cuprous oxide by-product may be converted back to the cupric acetate form by treatment with an aqueous solution of acetic acid. This regeneration step is best carried out with mild heating of the cuprous oxide and acetic acid while introducing a source of air through the mixture. By means of this expedient, there is no loss of the valuable copper constituent.

The following outlines a typical example of preparation of a trialkyl lead acetate via the process of the invention.

Example 1

To 2 liters of isopropyl alcohol were charged 770 grams of tetrabutyl lead and 380 grams of cupric acetate. Heating was initiated with the bulk of the reaction being carried out at a temperature ranging from about 73° C. to about 78° C. After about 1 hour and 55 minutes, the theoretical amount of butane gas had been released, and the reaction was ceased. The cuprous oxide solids were removed by filtration after allowing the reaction mass to cool. The filtrate was partially evaporated to remove solvent and the concentrate mixed with about 10 volumes of water. The resultant solids were collected. The remaining solution was further evaporated for a number of days. After this period of time, the solids from this evaporation were also washed with water and added to the first collected fraction. The entire amount of solids was taken up in petroleum ether, filtered to remove suspended impurities and the petroleum ether evaporated. The recrystallized solids were then filtered and dried in a vacuum oven. The total yield of solids in this run was 538 grams.

The invention is hereby claimed as follows:

1. A method of preparing a trialkyl lead acetate which comprises the step of reacting approximately equal molar amounts of a tetraalkyl lead with cupric acetate at a temperature ranging from about 40° C. to about 90° C. at a time ranging from about 1 to about 6 hours and recovering said trialkyl lead acetate product and cuprous oxide as a by-product.

2. The method of claim 1 wherein the reaction is effected in presence of a water-soluble organic solvent and the total concentration of said reactants in said solvent ranges from about 10% to about 20% by weight.

3. The method of claim 1 wherein said tetraalkyl lead reactant contains alkyl radicals having a carbon content ranging from 1 to 10 carbon atoms.

References Cited

UNITED STATES PATENTS 1,987,685  1/1935  Kharasch.
2,673,869  3/1954  Flenner _____ 260—431

OTHER REFERENCES

Chemical Abstracts, vol. 39, p. 1841 (1945).
Chemical Abstracts, vol. 44, p. 542 c–f (1950).
Chemical Abstracts, vol. 55, pp. 82, 82b (1961).
Dub Organometallic Compounds, vol. II, Springer-Verlag Berlin (1961), pp. 256, 260 and 304.

TOBIAS E. LEVOW, *Primary Examiner.*

H. M. S. SNEED, *Assistant Examiner.*

U.S. Cl. X.R.

260—437; 23—183